United States Patent [19]

Croket

[11] Patent Number: 5,006,236

[45] Date of Patent: Apr. 9, 1991

[54] CONTAMINANT ENTRAINED FLOW SEPARATING APPARATUS

[75] Inventor: Frank M. Croket, Louisville, Ky.

[73] Assignee: Hallco Fabricators, Inc., Louisville, Ky.

[21] Appl. No.: 411,814

[22] Filed: Sep. 25, 1989

[51] Int. Cl.⁵ .................. B01D 29/56; B01D 29/94
[52] U.S. Cl. ................................. 210/162; 210/171; 210/255; 210/332; 210/415
[58] Field of Search ............... 210/162, 171, 189, 252, 210/255, 332, 413, 415

[56] References Cited

U.S. PATENT DOCUMENTS

| | | | |
|---|---|---|---|
| 1,024,230 | 4/1912 | Turner et al. | 210/415 |
| 2,818,165 | 12/1957 | Dupps | 198/673 |
| 2,929,504 | 3/1960 | Lind et al. | 210/162 |
| 3,080,065 | 3/1963 | Hunt | 210/415 |
| 3,176,606 | 4/1965 | Zoffmann | 210/415 |
| 3,188,942 | 6/1965 | Wandel | 210/415 |
| 3,322,283 | 5/1967 | Babunovic et al. | 210/415 |
| 4,002,559 | 1/1977 | Paterson et al. | 210/415 |
| 4,859,322 | 8/1989 | Huber | 210/415 |

Primary Examiner—James C. Housel
Attorney, Agent, or Firm—Polster, Polster & Lucchesi

[57] ABSTRACT

Apparatus for separating contaminants from contaminant entrained flows including an inclined longitudinally extending filtering trough with a floating conveyor disposed therein, the trough having a lower inlet and upper outlet and being pivotally mounted intermediate its extremities relative a sump so that the lower portion of the trough extends into the sump with the conveyor driven at its lower extremity from a power source adjacent the pivot area and in spaced relation from the trough outlet.

11 Claims, 3 Drawing Sheets

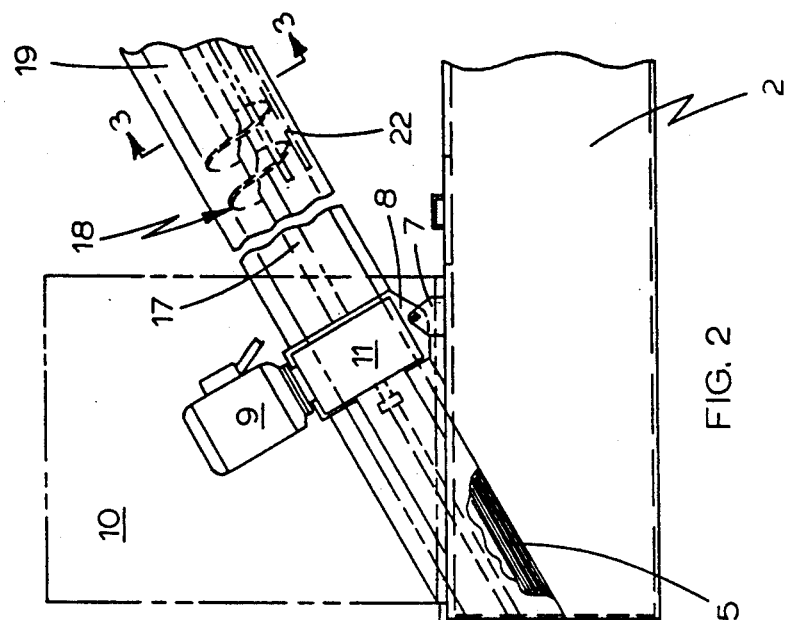
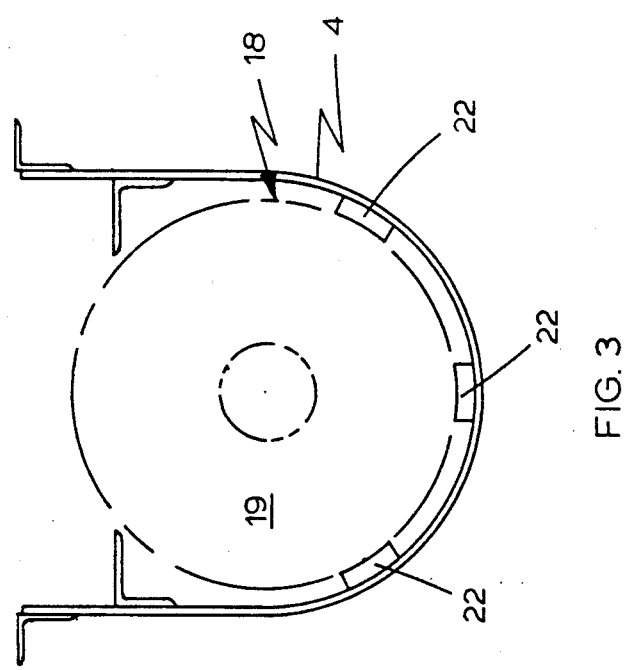

CONTAMINANT ENTRAINED FLOW SEPARATING APPARATUS

BACKGROUND OF THE INVENTION

The present invention relates to contaminant entrained flow separating apparatus and more particularly to an apparatus for separating solid contaminants from contaminant entrained flows, such as lubricating and coolant flows utilized in the metal working industry where long, thin metal shavings and both large and small chips become entrained in flows such as lubricating and coolant fluids circulated through the metal working machinery.

An efficient and effective separation of entrained contaminants from a flow, particularly a liquid fluid flow, has been a desideratum of the metal working and woodworking industries where it is desirable not only to recovery the separated solid materials but to utilize the entraining flow and/or liquid in a recirculating system.

Various types of filtration separators have been utilized in the past to accomplish such separation for further utilization of fluids and solids including apparatus which has utilized an inclined separating trough with the lower filtering portion of the trough cooperatively disposed in a flow containing sump. In this regard, attention is directed to U.S. Pat. No. 2,929,504, issued to A.C. Lind et al. on Mar. 22, 1960 and to U.S. Pat. No. 3,865,727, issued to F. W. Broling et al. on Feb. 11, 1975, both patents teaching fixed, inclined waste-flow screening apparatus, each with the drive means for the screw conveyor adjacent the upper extremity thereof, the latter patent also teaching different sized sorting screens. However, none of the past structures teaches or recognizes the problems involved in locating the conveyor drive mechanism adjacent the separated contaminant outlet nor does any one of the known past structures of the contaminant separating art teach or suggest an arrangement which minimizes jamming through heavy agglomeration, and which allows ready movement and accessibility to the screening apparatus for servicing and maintenance.

In accordance with the present invention, a unique, straightforward, and economical to manufacture and assemble contaminant entrained flow separating apparatus is provided which recognizes and resolves the aforementioned problems involved in movement of contaminant separating structure, accessibility of structure for servicing and maintenance, and conveyor interference by separated contaminants. In accordance with the present invention, a novel, cantilevered, floatingly supported screw conveyor is provided which is driven from a position remote from the separated contaminant solids outlet with the weight of the power portion of the drive mechanism located adjacent the pivot area of the conveyor structure to facilitate movement and to allow ready accessibility of the screening apparatus for maintenance and servicing.

Various other features of the present invention will become obvious to one skilled in the art upon reading the description of the invention herein.

BRIEF SUMMARY OF THE INVENTION

More particularly, the present invention provides a unique and novel apparatus for separating solid contaminants from contaminant entrained flows comprising: a sump for containing filtered flows from which solid contaminants have been removed; a longitudinally extending inclined filtering trough having its lower end disposed in the sump to pass filtered flows therethrough, the trough having an inlet for introduction of contaminant entrained flows thereto for filtration thereof and an outlet for free passage therefrom of separated solids; longitudinally extending conveyor means disposed within the filtering trough for removing the separated solids to the trough outlet; power means spaced from the trough outlet in cooperative drive connection with the lower extremity of the conveyor means to drive the same; and means to remove filtered flows from the sump.

In addition, the present invention provides a novel pivoting arrangement with the weight and location of the principal or power portion of the drive mechanism being adjacent the pivot area of the conveyor structure to enhance pivotal movement of the filter trough and conveyor disposed therein for ready maintenance and servicing accessibility.

Further, the present invention provides a novel manner for mounting the conveyor to provide a cantilevered floating arrangement which readily yields to possible interfering and otherwise binding agglomerated solids. In addition the novel structure of the present invention provides for the ready utilization of multiple assemblies driven through a common power source, the multiple assemblies being capable of accommodating to various surrounding physical conditions where different angles of lift for separated solids might be desirable.

It is to be understood that various changes can be made by one skilled in the art in one or more of the several parts of the apparatus disclosed herein without departing from the scope or spirit of the present invention. For example, endless belt-type conveyor means could be utilized in each assembly rather than a screw conveyor as disclosed, the drive linkage for the conveyor could include an assembly of belts and pulleys, and other types of solid separating filter mechanisms could be employed.

BRIEF DESCRIPTION OF THE DRAWINGS

Referring to the drawings which disclose one advantageous embodiment of the present invention and a modification thereof:

FIG. 2 is a somewhat enlarged side view, partially in phantom, of a lower portion of the inventive apparatus of FIG. 1;

FIG. 3 is a further enlarged cross-sectional view of the filter trough and conveyor assembly taken in a plane through line 3—3 of FIG. 2, broadly disclosing the novel manner of support of the contaminant moving helical screw conveyor flight disposed within the filter trough.

DETAILED DESCRIPTION OF THE DRAWING

Figure 1:
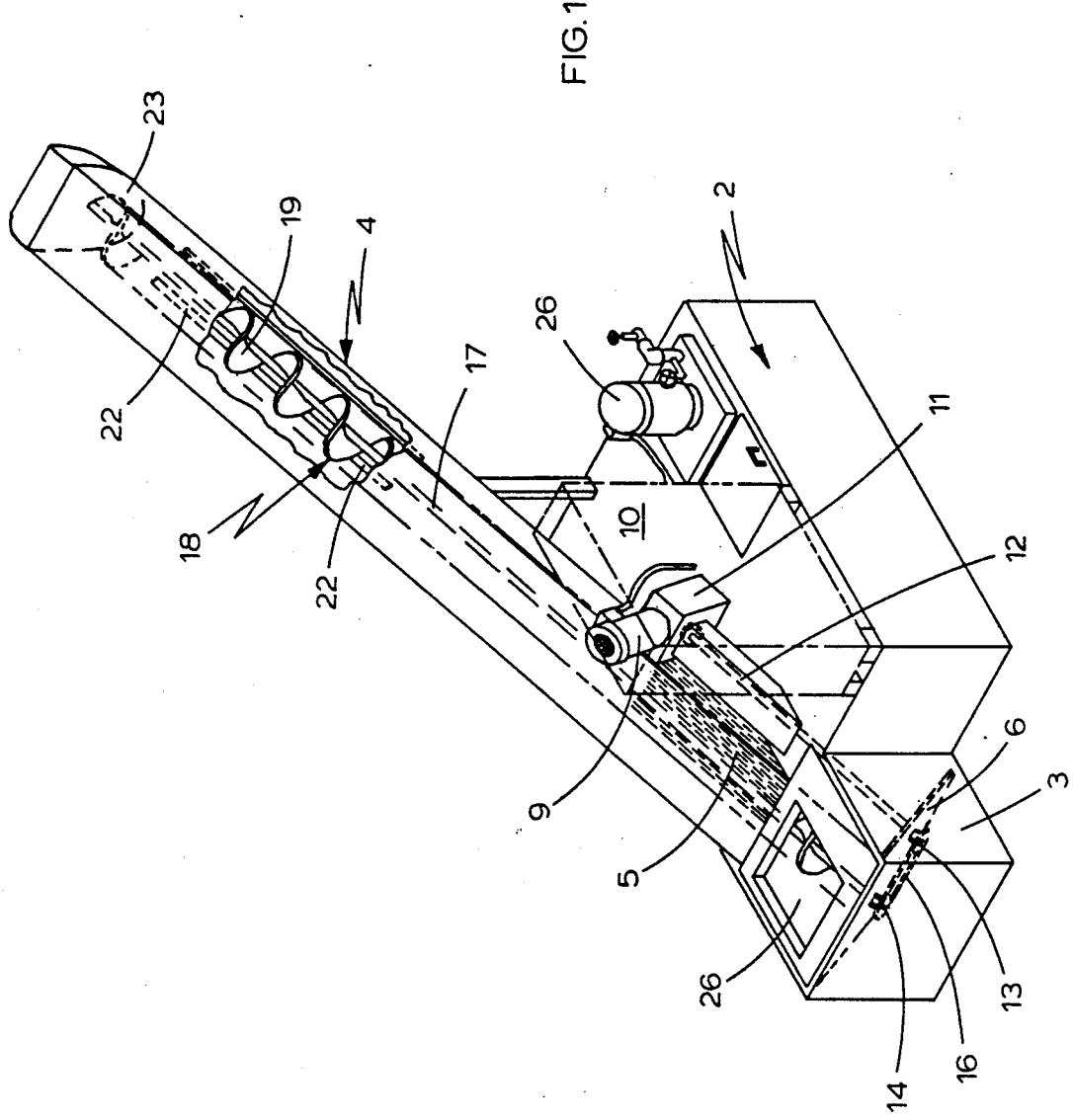
FIG. 1 is an isometric partially broken away, schematic view of a novel contaminant entrained flow separating apparatus incorporating several of the features of the present invention.

Referring to FIGS. 1 and 2 of the drawings, the novel apparatus for separating solid contaminants from contaminant entrained flows, such as in finely divided particulate materials in liquid coolants and lubricants, is disclosed as including a suitably shaped sump 2, which in FIG. 1 is shown to be of a generally rectangular shape with a smaller trough receiving box 3 communicatively connected thereto. Sump 2 can be made from any one of a number of appropriate materials, such as an appropriate gauge galvanized sheet metal, the particular material selected depending upon the nature of the flow which is to be contained. Although not shown in the drawings, it is to be understood that the sump can be provided with an appropriate flow drain in the lower portion of the flow containing peripheral sidewalls thereof and that a suitable top cover or covers can be provided to cover select portions thereof to avoid or at least reduce flow spill therefrom and to provide appropriate mounting platforms for apparatus described hereinafter.

Arranged to project into the lower portion of small trough receiving box 3 of sump 2 is the lower end portion of a longitudinally extending inclined filtering trough 4. The lower end portion of trough 4 includes a partially foraminous screen filter bottom 5 with the lower extremity of trough 4 being provided with an extended end plate 6 which rests on the bottom of sump 4 to hold the lower end portion of trough 4 in spaced relation from the sump bottom. Trough 4 is pivotally mounted on and above sump 2 intermediate the trough extremities through a pair of vertically extending spaced standards 7 (FIG. 2) mounted in spaced apart relation on the sidewalls of sump 2. A suitable cradle or saddle assembly 8 (shown only schematically in FIG. 2) extends between and is pivotally mounted to spaced standards 7. This cradle assembly which can be of U-shape serves as an undersupport for filtering trough 4 which nests in cradle assembly 8. Cradle assembly 8 further supports an appropriately sized power motor 9 connected to a power control box 10 (disclosed in phantom). Motor 9 is connected to a drive system in the form of a gear reducer box 11 also supported on cradle assembly 8. Gear reducer box 11 is connected to one end of a hood protected drive shaft 12 which extends in spaced, parallel relation to one side of the lower portion of trough 4 (FIG. 1). The other end of drive shaft 12, which is downwardly extending during operation, is provided with a sprocket 13 to drive spaced sprocket 14 through drive chain 16. Sprocket 14, in turn, is fixed to the end of central shaft 17 of a longitudinally extending screw conveyor 18, the conveyor 18 including a helical or screw-like flight 19 mounted to and extending in helically wound fashion about central shaft 17. Although not shown in detail in the drawings, the conveyor flight 19 extends from one extremity of central shaft 17 to the other extremity thereof with screw conveyor 18 extending substantially the full length of filtering trough 4. The central shaft 17 of screw conveyor 18 has mounted to what is its lower end when pivoted into an inclined position a bearing 21 which bearing 21, in turn, is fixed to the extended end plate 6 of trough 4.

In accordance with one feature of the present invention, the remainder and opposite upper end of central shaft 17 is free to float and thus screw conveyor 18 is mounted for floating cantilevered rotation only in bearing 21 to extend longitudinally in floating fashion from end plate 6 substantially along the full length of trough 4. In this regard, it is to be noted that the outer edges of the flight 19 of screw conveyor 18 ride on spaced longitudinally extending straps in the form of wear spacer skids 22 mounted in the bottom of the upper portion of trough 4. These straps or wear skids 22 serve to support screw conveyor 18 in spaced floating relation from the bottom of trough 4, the cantilevered floating arrangement of the conveyor allowing the conveyor to floatingly yield in the event of confrontation with agglomerated contaminant chips or elongated waste strips which will be carried or moved upwardly within the trough by the floating screw conveyor to the unobstructed outlet 23 at the uppermost extremity of trough 4. It is to be noted that the bottom of the lower portion of trough 4 is in the form of a filtering screen 5 which can be of U-shaped cross-section, which can extend longitudinally along the trough from end plate 6 to pivot standards 7 and which advantageously can be of wedge-wire screen material. The remainder of trough 4 including the upper portion can be encased in a suitable non-pervious material such as sheet metal except for the inlet 26 in the lower portion of the trough which allows for the introduction of contaminant entrained flow materials into the filter trough apparatus to screen such flow materials through contaminant separating filter screen 5 with the screened flow passing therethrough into sump 2 to be recirculated to the working site by a suitable gusher pump 26 extending into sump 2. The separated contaminants are carried to unobstructed outlet 23 at the extremity of the upper portion of trough 4 by floating screw conveyor 18 for further processing.

Figure 4:
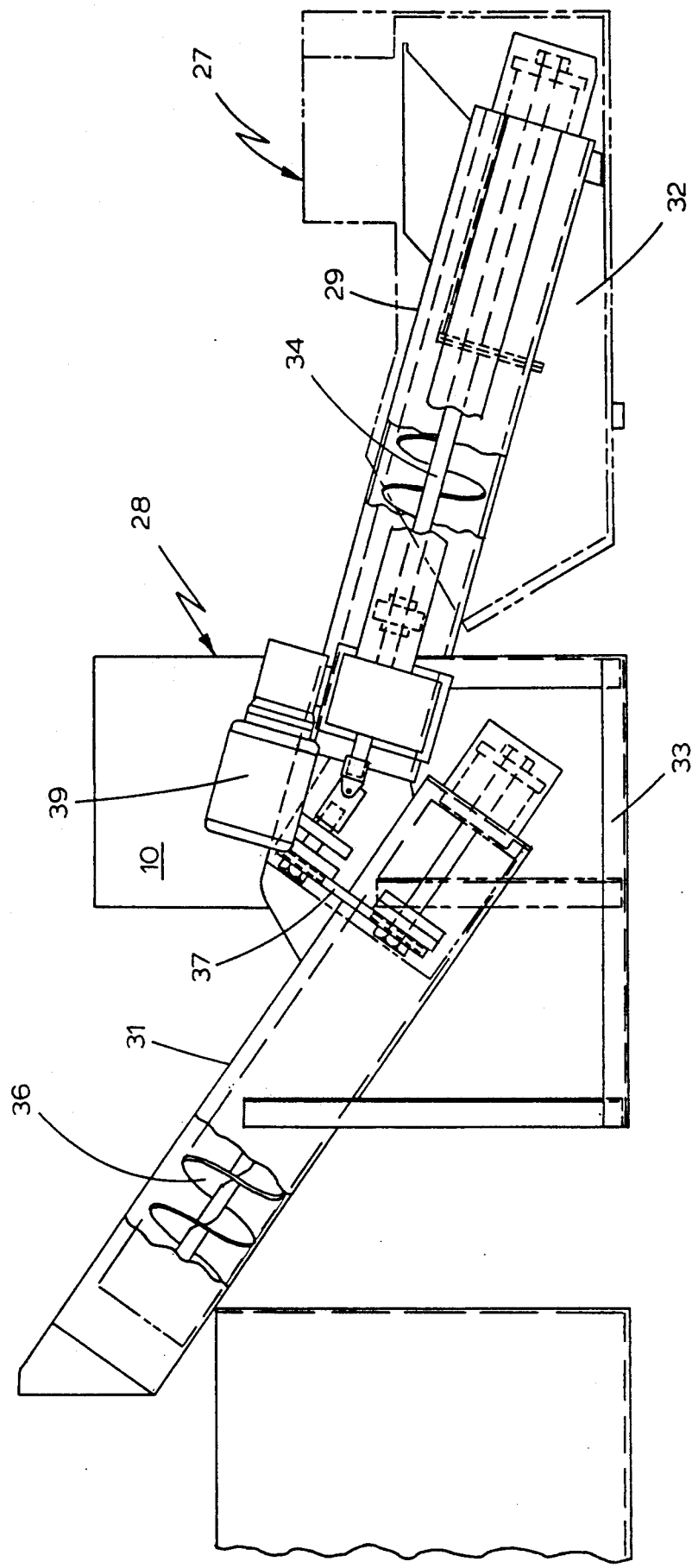
FIG. 4 is a side view of one modification of the flow separating apparatus of the present invention, disclosing schematically two assemblies with a similar screw conveyor to that of FIGS. 1-3 positioned in series and driven from the same power source.

Referring to FIG. 4 of the drawings, a modified assembly arrangement for separating solid contaminant from a containment entrainment flow is disclosed wherein two first and second assemblies 27 and 28 respectively, each having screw conveyors similar to the one described above are schematically disclosed, each assembly 27 and 28 having an inclined trough 29 and 31 respectively with an inlet and outlet and a longitudinally extending screw conveyor 34 and 36 respectively substantially like that described above with such first and second assemblies 27 and 28 being arranged in series sequence.

In the arrangement disclosed, a separate sump 32 and a conveyor support structure 33 respectively are shown with the outlet of the inclined trough 29 of first assembly 27 communicating with the inlet of inclined trough 31 of second assembly 28. In the disclosed arrangement, screw conveyor 34 of first assembly 27 is connected to screw conveyor 36 of series related assembly 28 through a sprocket and chain drive assembly 37 to be driven by common power motor 39. In this regard, it is to be noted that the location of common power motor 39 and pivot locations (not disclosed) can be adjusted to accommodate for existing environment but advantageously the screw conveyors 34 and 36 of both assemblies 27 and 28 respectively are each connected to be driven at the lower extremities thereof by the common power motor 39. In accordance with another feature of the present invention, it is to be noted that the incline of filter trough 29 can be at a different preselected angle from that of the incline of conveyor trough 31 with the angle of incline of trough 31 as shown being greater than that of trough 29. It is to be understood that the preselected incline angle of each of the troughs 29 and 31 can be varied in accordance with the physical nature of the environment and the materials to be treated. It further is to be understood that, although separate screw conveyors 34 and 36 are disclosed for a condition which necessarily might require separate screw conveyors under certain contaminant conditions, it would be possible to eliminate screw conveyor 36 and depend only upon screw conveyor 34 to move the contaminants along both troughs 29 and 31.

From the above description, it can be seen that a unique and novel apparatus for separating solid contaminants from contaminant entrained flows is provided which allows for ready accessibility and maintenance of contaminant conveyors, such conveyors being yieldably and readily adjustable in cantilevered floating fashion to the agglomeration of contaminant particles during operation and readily arranged in series with additional conveyor and trough assemblies at different angles of incline, depending upon the existing physical conditions confronted.

The invention claimed is:

1. Apparatus for separating solid contaminants from contaminant entrained fluid stream flows comprising:

a sump for containing filtered flows from which solid contaminants have been removed; a longitudinally extending inclined filtering trough having lower and upper ends with said lower end pivotally disposable in said sump about a pivot axis intermediate said lower and upper ends to pass filtered flows thereto, said trough having an inlet above said lower end for introduction of contaminant entrained flows thereto for filtration thereof and an outlet adjacent said upper end for free passage therefrom of separated solids;

longitudinally extending conveyor means disposed within said filtering trough for removing the separated solids to said trough outlet;

power means spaced intermediate said trough inlet and said trough outlet above said sump substantially adjacent said pivot axis in cooperative drive connection with the lower extremity of said conveyor means to drive said conveyor means; and means to remove said filtered flows from said pump.

2. The apparatus for separating solid contaminants of claim 1, said inclined filtering trough and power means being pivotally mounted intermediate said trough extremities relative said sump for pivotal movement relative said sump to remove said lower end of said trough from said sump for filter servicing.

3. The apparatus of claim 2, and a spacer to space said lower end of said trough from the bottom of said sump.

4. The apparatus for separating solid contaminants of claim 1, said inclined filtering trough having at least a portion of its lower end in the form of a U-shaped filtering screen.

5. The apparatus for separating solid contaminants of claim 1, said conveyor means comprising a screw conveyor.

6. The apparatus for separating solid contaminants of claim 1, said conveyor means having its lower end mounted at the lower end of said inclined filtering trough to extend upwardly along said filtering trough in free cantilevered fashion from said mounted lower end; and, support means to support said cantilevered conveyor means and hold said cantilevered conveyor means in spaced relation to said trough.

7. The apparatus for separating solid contaminants of claim 1, said conveyor means being a screw conveyor having is lower end rotatably mounted at the lower end of said filtering trough to extend upwardly in said trough in floating cantilevered fashion therefrom; and, support means in the form of longitudinally extending wear spacer skids fastened to the bottom of said filtering trough to extend longitudinally along the length thereof to support said floating cantilevered screw conveyor and position same cantilevered screw conveyor in spaced rotatable relation from the bottom of said trough.

8. An apparatus for separating solid contaminants from contaminant entrained fluid stream flows comprising: a first assembly including a first sump for containing filtered flows from which solid contaminants have been removed;

a first longitudinally extending inclined filtering trough having lower and upper ends with said lower end pivotally disposable in said first sump to pass filtered flows thereto, said trough having an inlet above said lower end for introduction of contaminant entrained flows thereto for filtration thereof and an outlet adjacent said upper end for free passage therefrom of separated solids; a first longitudinally extending conveyor means disposed within said filtering trough for removing the separated solids to said trough outlet; a second assembly including a second sump and a second longitudinally extending filtering inclined trough having upper and lower ends with said lower end disposed in said second sump with a lower inlet and an upper outlet with said lower inlet above said lower end and a second longitudinally extending conveyor disposed therein, said first and second assemblies being arranged in series with the outlet of said first inclined trough of said first assembly in communication with said lower inlet of said second inclined trough of said second assembly; a common power means disposed intermediate said first and second assemblies with said first and second conveyor means of said first and second assemblies being connected through drive linkage to a lower extremity of each of said conveyor means substantially adjacent said lower ends of said troughs to be driven by said intermediately disposed common power means; and, means to remove said filtered flows from said first and second sumps.

9. The apparatus of claim 8, said second inclined trough of said second assembly being inclined at a greater preselected angle that the preselected angle of incline of said first inclined trough of said first assembly.

10. The apparatus of claim 8, wherein the incline of said second trough of said second assembly is at a different preselected angle from that of said first trough of said first assembly.

11. Apparatus for separating solid contaminants from containment entrained liquid flows comprising;

a sump for containing filtered liquid flows from which solid contaminants have been removed;

a longitudinally extending inclined filtering trough having lower and upper ends with a pivotal carriage mounting intermediate said ends above said sump for pivotal movement relative thereto to remove said lower end of said filtering trough from said sump for filter servicing, said lower end of said trough being in the shape of a U-shaped wedge-wire screen, said trough having an inlet at said lower end for introduction of containment entrained flows thereto for filtration thereof and a spaced outlet at the upper end of said trough for free passage of separated solids;

a longitudinally extending cantilevered screw conveyor disposed in said filtering trough with its lower extremity rotatably disposed in said filtering trough to extend upwardly in said trough in floating cantilevered fashion to said trough outlet;

a set of spaced longitudinally extending wear spacer skids fastened to the bottom of said filtering trough to extend along the length thereof to support said floating cantilevered screw conveyor to position said cantilevered screw conveyor in spaced rotatable relation to the bottom of said trough; a drive motor mounted on said trough substantially adjacent the pivotal mounting thereof in spaced relation from said trough outlet; a drive system connecting said drive motor to said rotatably disposed lower extremity of said floating cantilevered screw conveyor; and a pump disposed in said sump pump filtered flows from said sump for recirculated use.

* * * * *